United States Patent
Beier et al.

(10) Patent No.: US 9,587,560 B2
(45) Date of Patent: Mar. 7, 2017

(54) JET ENGINE WITH AT LEAST ONE OIL SEPARATOR

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 303 days.

(21) Appl. No.: 14/318,848

(22) Filed: Jun. 30, 2014

(65) Prior Publication Data
US 2015/0000246 A1    Jan. 1, 2015

(30) Foreign Application Priority Data
Jul. 1, 2013    (DE) ................... 10 2013 106 879

(51) Int. Cl.
*F02C 7/06* (2006.01)
*F01D 25/18* (2006.01)

(52) U.S. Cl.
CPC ............ *F02C 7/06* (2013.01); *F01D 25/18* (2013.01); *F05D 2260/601* (2013.01); *F05D 2260/605* (2013.01); *F05D 2260/609* (2013.01); *F05D 2300/514* (2013.01)

(58) Field of Classification Search
CPC ......... F05D 2260/601; F05D 2260/605; F05D 2260/609; F05D 2300/514; F02C 7/06; F01D 25/18
USPC ...................................................... 60/39.08
See application file for complete search history.

(56) References Cited

U.S. PATENT DOCUMENTS

| 3,378,104 | A | * | 4/1968 | Venable | F01D 25/18 184/6.12 |
| 3,722,212 | A | * | 3/1973 | Stein | F02C 7/14 184/6.11 |
| 4,050,237 | A | * | 9/1977 | Pall | B01D 39/1676 55/385.4 |
| 4,217,120 | A | | 8/1980 | Reynolds | |
| 4,525,995 | A | | 7/1985 | Clark | |

(Continued)

FOREIGN PATENT DOCUMENTS

| DE | 2845068 A1 | 4/1979 |
| DE | 69605014 | 5/2000 |

(Continued)

OTHER PUBLICATIONS

European Search Report dated Oct. 8, 2014 from counterpart app No. 14175254.3.

(Continued)

*Primary Examiner* — Steven Sutherland
(74) *Attorney, Agent, or Firm* — Shuttleworth & Ingersoll, PLC; Timothy J. Klima (57) ABSTRACT

A jet engine includes at least one oil separator, through which an air-oil volume flow can be guided out of several areas supplied with oil for separating the oil, where a device for spraying oil into the air-oil volume flow is provided. Oil can be sprayed in using the device in the area of each connection between an area supplied with oil and the oil separator and/or downstream of a combining area between at least two air-oil volume flows from two or more areas supplied with oil.

13 Claims, 5 Drawing Sheets

(56) References Cited

U.S. PATENT DOCUMENTS

| | | | |
|---|---|---|---|
| 5,004,407 A * | 4/1991 | Hutchison | F01D 25/20 184/6.23 |
| 5,054,583 A * | 10/1991 | Wrzyszczynski | F01D 25/125 184/104.1 |
| 5,114,446 A | 5/1992 | Giersdorf et al. | |
| 5,776,229 A | 7/1998 | Blanes et al. | |
| 6,893,478 B2 | 5/2005 | Care et al. | |
| 2005/0211093 A1 | 9/2005 | Latulipe et al. | |
| 2009/0014245 A1 * | 1/2009 | Shevchenko | F01D 21/10 184/6.4 |
| 2009/0133376 A1 | 5/2009 | Zysman | |
| 2009/0133961 A1 | 5/2009 | Corattiyil et al. | |
| 2009/0183950 A1 | 7/2009 | Brouillet et al. | |
| 2011/0314830 A1 | 12/2011 | Legare | |
| 2012/0060508 A1 | 3/2012 | Alecu et al. | |
| 2012/0128466 A1 | 5/2012 | Raimarckers et al. | |
| 2012/0144841 A1 | 6/2012 | Short et al. | |
| 2015/0000246 A1 | 1/2015 | Beier et al. | |
| 2015/0135660 A1 | 5/2015 | Beier et al. | |
| 2015/0135663 A1 | 5/2015 | Beier et al. | |
| 2015/0176447 A1 | 6/2015 | Beier | |
| 2015/0321130 A1 | 11/2015 | Beier et al. | |

FOREIGN PATENT DOCUMENTS

| | | |
|---|---|---|
| DE | 60308574 T2 | 1/2007 |
| DE | 102006058343 A1 | 7/2008 |
| EP | 2592252 | 5/2013 |
| FR | 2961856 | 12/2011 |

OTHER PUBLICATIONS

German Search Report dated Mar. 5, 2014 from related German application No. 10 2013 106 877.4.

European Search Report dated Sep. 22, 2014 from related European application No. 14173663.7.

German Search Report dated Mar. 5, 2014 from counterpart application No. 10 2013 106 879.0.

* cited by examiner

JET ENGINE WITH AT LEAST ONE OIL SEPARATOR

This application claims priority to German Patent Application DE102013106879.0 filed Jul. 1, 2013, the entirety of which is incorporated by reference herein.

This invention relates to a jet engine with at least one oil separator in accordance with the type defined in more detail herein.

In jet engines known from practice, oil-containing consumed air from bearing chambers and from an oil tank is supplied during operation via separate lines to an oil separator or to a so-called breather, which can be designed as a centrifugal oil separator. The large oil particles from the consumed air or the air-oil volume flows from the bearing chambers and the oil tank are separated by a deflection area provided in the area of the breather and acting as a centrifuge. Oil particles with smaller diameters are collected by a metal foam arranged in the oil separator and are also filtered out of the air in this way. The oil separated by this method is returned to the oil circuit. The cleaned air is discharged offboard into the environment.

The air-oil volume flows supplied to the breather or centrifugal oil separator are heavily oiled and have a high temperature. As a result, there are also very fine oil particles in the air-oil volume flows. Due to their small size, these particles are only insufficiently separated by means of the centrifuge and only inadequately retained by the metal foam located in the centrifuge. As a result, they pass via an outlet of the oil separator for the airflow into the environment. These losses are the reason for the average oil consumption of modern engines. Moreover, the oil droplets non-separable in the area of the oil separator exit the engine in the form of a fine mist which causes high oil consumption in jet engines and is also unwelcome for environmental considerations.

A gas-turbine oil separator with a casing is known from DE 10 2006 058 343 A1, with the casing being provided with an inlet. A filter element that can be set to rotate is arranged in the casing and is provided with an air outlet downstream of the filter element. Additionally, the casing includes at least one oil outlet. Means for applying electrostatic forces are arranged upstream of the filter element in order to increase the tendency of oil drops to combine with an oil film in the filter element, and to improve a separation capacity in the area of the gas-turbine oil separator.

A temperature of an air-oil volume flow introduced into such gas-turbine oil separators or breathers may be disadvantageously very high, which is why electrostatic charging of an air-oil mixture known from the state of the art is only of limited suitability for improving a separation capacity in the area of a gas-turbine oil separator, since the oil present in gaseous form in the air-oil volume flow is not separable to the required extent out of the air-oil volume flow using the known procedure.

The object underlying the present invention is therefore to provide a jet engine with at least one oil separator, in which by a simple and cost-effective design an oil content of an air volume flow discharged from the jet engine to the environment is as low as possible.

It is a particular object of the present invention to provide solution to the above problems by a jet engine having features as described herein.

In the jet engine in accordance with the invention with at least one oil separator or breather, the oil loss is reduced in a cost-effective and space-saving way in that several areas of a jet engine supplied with oil are in operative connection with the oil separator and that an air-oil volume flow can be guided through the oil separator out of several areas supplied with oil for separating the oil. Additionally, a device for spraying or introducing oil into at least one air-oil volume flow is provided.

It is proposed in accordance with the invention that oil can be sprayed in or introduced using the device in the area of each connection between an area supplied with oil and the oil separator and/or downstream of a combining area between at least two air-oil volume flows from two or more areas supplied with oil.

A defined oil spray jet is preferably directly introduced into the air-oil volume flow using the device. When sprayed-in oil droplets meet oil droplets already present in the air-oil volume flow, the sprayed-in oil droplets and the already present oil droplets combine to form larger drops, which is desirable, due to their forces of attraction, said drops being mechanically separable from the air in the further flow path of the air-oil volume flow with less effort than oil particles of smaller diameter. The possibility then exists of discharging the cleaned air downstream of the oil separator to the environment of the jet engine or to an engine core or bypass flow, while the separated oil is returned into an oil circuit of the jet engine.

Additionally, by spraying oil into the air-oil volume flow, a temperature of the air-oil volume flow can also be reduced when there is a suitable temperature difference between oil and the air-oil volume flow. With suitable cooling of the air-oil volume flow, the desired increase of the oil particle diameters in the air-oil volume flow is additionally favoured, since oil present in gaseous form condenses due to the temperature drop in the air-oil volume flow, which leads to an increase in the drop diameters of the oil particles present in the area of the air-oil volume flow.

Due to the fact that in the area of each connection between an area supplied with oil and the oil separator, oil can be sprayed in using the device, the oil quantity sprayed in and the droplet size generated during spraying in can be adjusted in each case to the respective loading of an air-oil volume flow of an area supplied with oil in a jet engine, for example adapted to its current temperature, and the required increase in the particle diameter adapted in each case to the currently prevailing operating point can be obtained to the required extent.

If oil is, additionally or alternatively thereto, sprayed in using the device downstream of a combining area between at least two air-oil volume flows from two or more areas supplied with oil, the separation capacity in the area of the oil separator and/or of the deflection area and/or of the optional centrifuge can be improved to the required extent with low effort.

In an embodiment of the jet engine operable with a high separation capacity in the area of the oil separator, said oil separator is designed with a porous area that can be set to rotate and which is arranged in the flow path of the air-oil volume flow and can be passed by said air-oil volume flow.

The increase as described above of the drop diameters, which is effected by the device, also leads to an improvement of the separation capacity in the porous area of the oil separator, in which the oil present in the air-oil volume flow is separated from the latter on the one hand as in the area of an impingement filter and on the other hand as in the area of a centrifuge, when the device is arranged upstream of the porous area. The oil particles now enlarged by the so-called washing-out of the oil using the device can be separated in the porous area, which can be designed preferably as metal foam or the like, more efficiently and with low effort. As a result oil losses occurring via the exhaust air of a jet engine are minimized by the reduced emissions.

In a simply designed embodiment of the jet engine in accordance with the invention, at least one deflection area is provided in the flow path of the air-oil volume flow preferably upstream of the porous area of the oil separator, in the area of which at least part of the oil can be separated from the air-oil volume flow by the effect of the centrifugal force. As a result, larger oil particles or oil droplets can be separated from the air-oil volume flow even before entry into the porous area of the oil separator in a simple design, and a flow resistance in the porous area of the oil separator due to an excessive load of oil can be limited to a defined level.

The separation capacity can, in a further development of the jet engine in accordance with the invention, be improved in that again preferably upstream of the porous area of the oil separator at least one centrifuge is provided in the flow path of the air-oil volume flow, in the area of which at least part of the oil can be separated from the air-oil volume flow by the effect of the centrifugal force. The degree of separation can here be set to the required extent depending on the energy applied in the area of the centrifuge, for example depending on the degree that the air-oil volume flow is loaded with oil.

In a simple to assemble embodiment of the jet engine, the deflection area and/or the centrifuge is provided in the area of the oil separator and preferably integrated into a casing of the oil separator, so that the oil separator represents a module fittable with low effort inside the intended installation space of the jet engine. In an alternative embodiment, the deflection area and/or the centrifuge is provided in the area of a pre-chamber, so that already known jet engines can be constructed with little design effort to the extent in accordance with the invention, since the pre-chamber can be connected in simple manner upstream of the oil separator in the flow path of the air-oil volume flow.

In further advantageous embodiments of the jet engine in accordance with the invention, the device for spraying oil into the air-oil volume flow is provided upstream and/or downstream of the deflection area and/or upstream and/or downstream of the centrifuge, in order to set a required high separation capacity of oil from the air-oil volume flow.

With an arrangement of the device for spraying oil into the air-oil volume flow upstream of the deflection area and of the centrifuge, a separation capacity can here already be improved in the zone of the deflection area and of the centrifuge by appropriate enlargement of the droplet size of the oil present in the air-oil volume flow. Furthermore, a separation capacity can be further increased by the again enlarged droplet size, in particular in the porous area of the oil separator, when the device for spraying oil into the air-oil volume flow is arranged downstream of the deflection area and also downstream of the centrifuge. The separation capacity is improved when the droplet sizes of oil particles in the air-oil volume flow downstream of the deflection area and downstream of the centrifuge, which due to their size are not separable in the porous area of the oil separator, assume a particle size readily separable in the porous area due to the spraying of oil into the air-oil volume flow using the device.

If the air-oil volume flows guidable from the areas supplied with oil in the direction of the oil separator can be combined at least partially before entry into the oil separator, the separation capacity in the area of the oil separator can be increased with low effort in the area of the device for spraying oil into the air-oil volume flows, since oil is to be sprayed preferably only at one point into the flow path of the air-oil volume flow supplied to the oil separator.

If an area supplied with oil is an accessory gearbox whose internal pressure during operation can be raised to values above a pressure threshold, the air-oil volume flow can be guided out of the accessory gearbox in the direction of the oil separator with low effort.

In further advantageous embodiments of the jet engine in accordance with the invention, the oil separator and/or the pre-chamber and/or the deflection area and/or the centrifuge is/are arranged at least partially inside and/or outside a casing of the accessory gearbox, where an arrangement of the various assemblies inside the accessory gearbox casing represents additional protection of the oil separator, of the pre-chamber, of the deflection area and/or of the centrifuge from environmental effects, while an arrangement of said assemblies outside the accessory gearbox casing in some circumstances does not necessitate design modifications in the area of the accessory gearbox casing.

An area supplied with oil is, in further advantageous embodiments of the jet engine in accordance with the invention, a bearing chamber and/or an oil tank, so that oil transported out of these areas by an airflow is separable from the latter to the extent described above with a high separation capacity and can be returned with low effort into an oil circuit of a jet engine.

Depending on the application in question, it is also possible to design the oil separator of the jet engine in accordance with the invention with means for applying electrostatic forces known from DE 10 2006 058 343 A1 in order to further improve the separation capacity of the oil separator.

The features stated in the following exemplary embodiments of the jet engine in accordance with the invention are each suitable, singly or in any combination with one another, to develop the subject matter of the jet engine. The respective feature combinations do not represent any restriction with regard to the development of the subject matter, but have substantially only exemplary character.

Further advantages and advantageous embodiments of the jet engine in accordance with become apparent from the present description with reference to the accompanying drawings, where in the description of the various exemplary embodiments the same reference numerals are used for components of identical design and function for greater clarity.

Figure 1A:
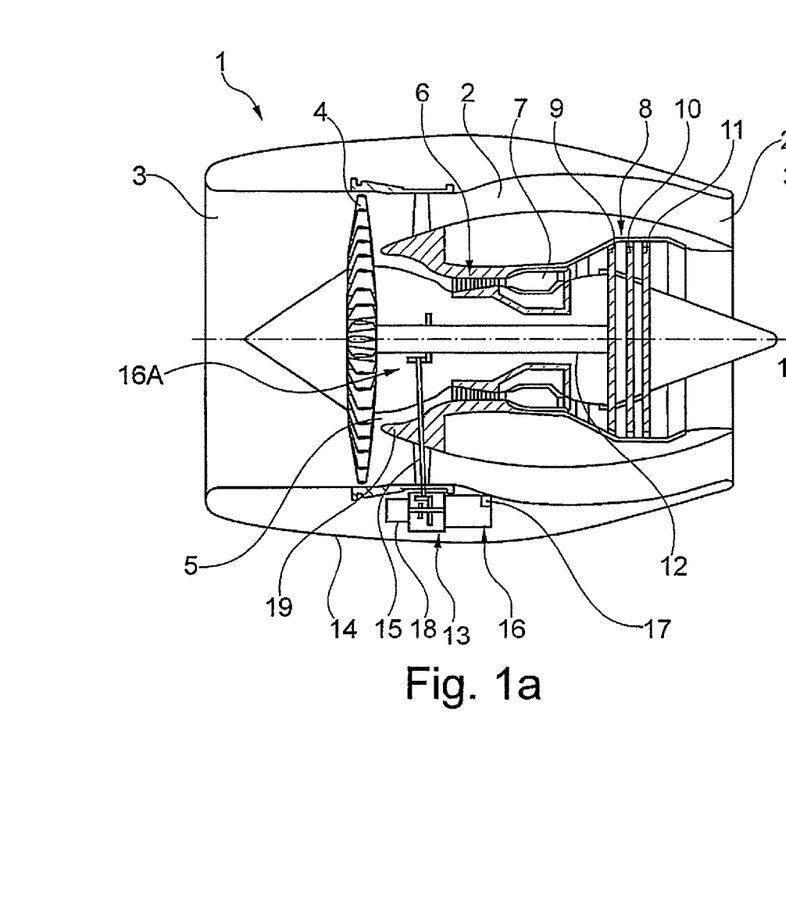
FIG. 1a shows a highly schematized longitudinal sectional view of a jet engine with an accessory gearbox arranged in the fan casing.
Figure 1B:
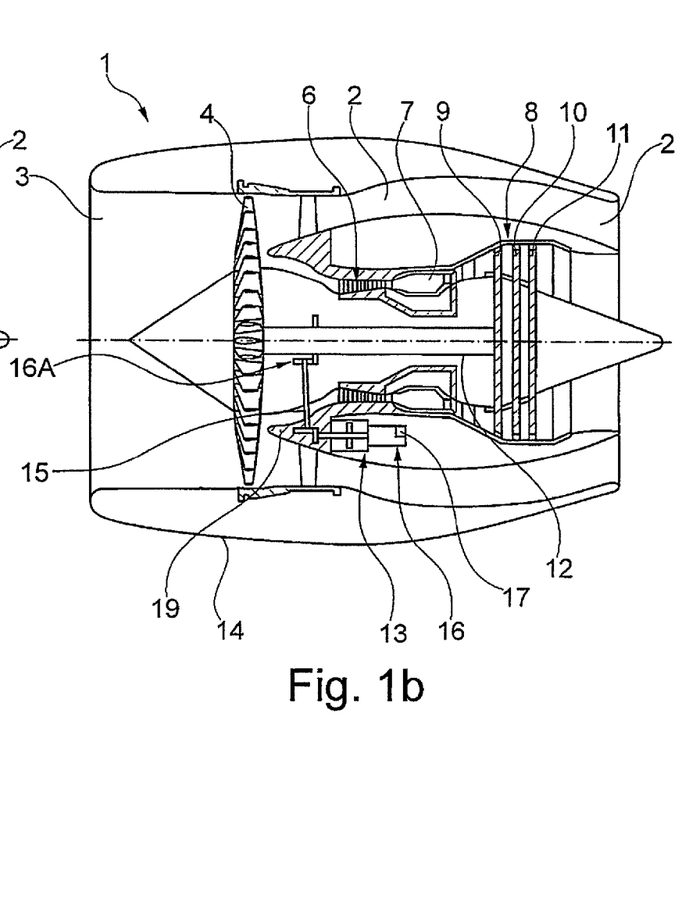
FIG. 1b shows a representation of a jet engine corresponding to FIG. 1a, with an accessory gearbox mounted in the area of the engine core.

FIGS. 1a and 1b each show a jet engine 1 in a longitudinal sectional view. The jet engine 1 is provided with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in the present invention three rotor devices 9, 10 and 11, which have a substantially comparable design and are connected to an engine axis 12.

In the design of the jet engine 1 according to FIG. 1a, an accessory gearbox 13 is arranged in an outer engine casing 14, delimiting the bypass duct 2 and representing the outer circumferential area of the jet engine 1. The accessory gearbox 13 in the present invention is connected via a drive shaft 15 running in the radial direction of the jet engine 1 and via an inner gearbox 16A to the engine axis 12 and is thus driven/subjected to torque by the engine axis 12 during operation of the jet engine 1. Various auxiliary units 16 and an oil separator 17, which is also referred to as breather, are subjected to torque to the required extent by the accessory gearbox 13. Additionally, an oil tank 18 is provided in the area of the accessory gearbox 13, which represents a hydraulic fluid reservoir, from which oil is tapped for cooling and lubricating various areas of the jet engine 1 such as bearing devices, gear pairings of the inner gearbox 16A and of the accessory gearbox 13, and further assemblies of the jet engine 1 that are to be cooled and lubricated.

In contrast to this, the accessory gearbox 13 with the auxiliary units 16 and the oil separator 17 is arranged, in the design of the jet engine 1 according to FIG. 1b, in the radial direction between the bypass duct 2 and the engine core 5 in a component 19 delimiting both the bypass duct 2 and the engine core 5.

Figure 2:
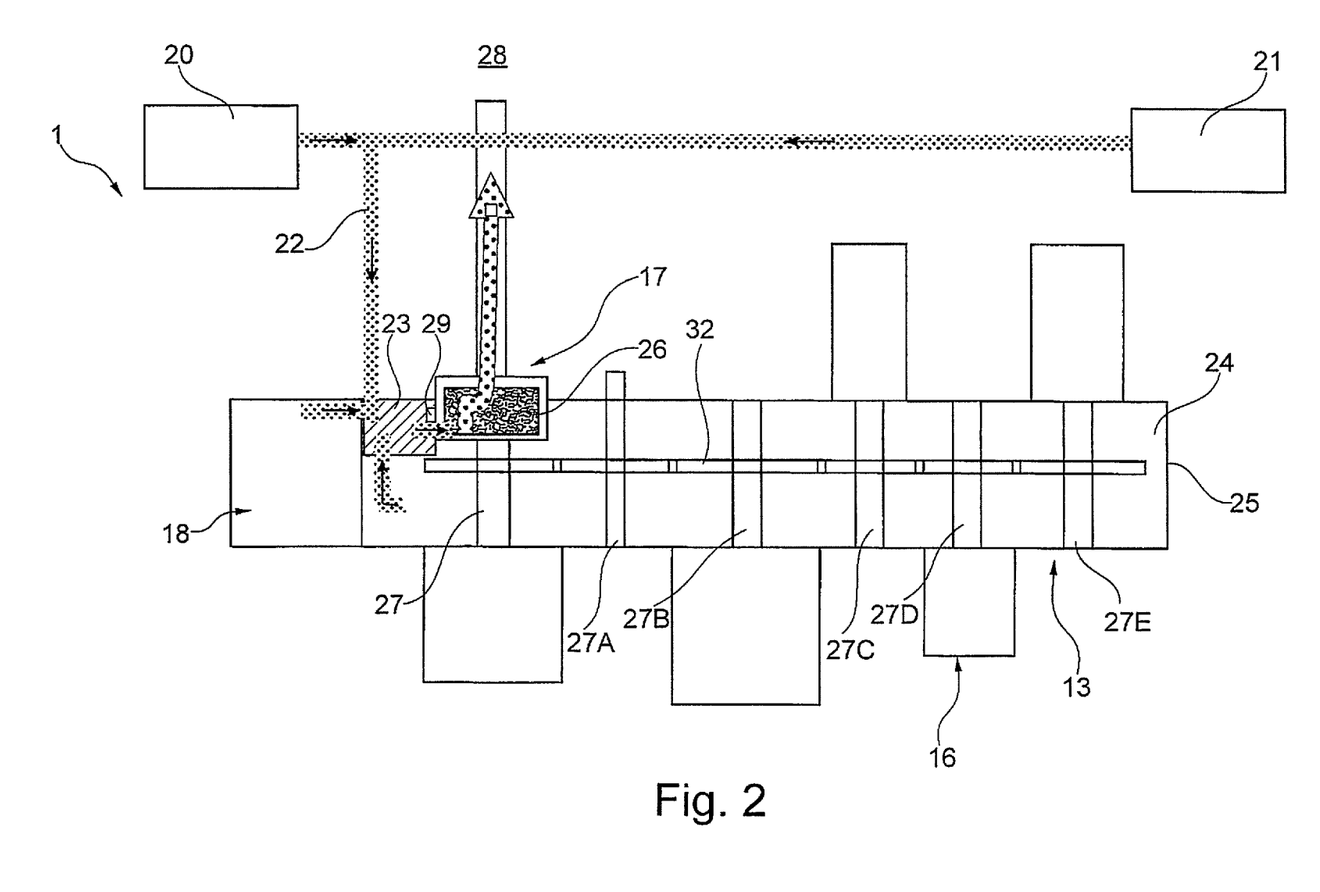
FIG. 2 shows a highly schematized partial representation of the jet engine according to FIG. 1a or FIG. 1b, with an oil separator arranged in the area of the accessory gearbox, and associated pre-chamber provided in a casing of the accessory gearbox.
Figure 3:
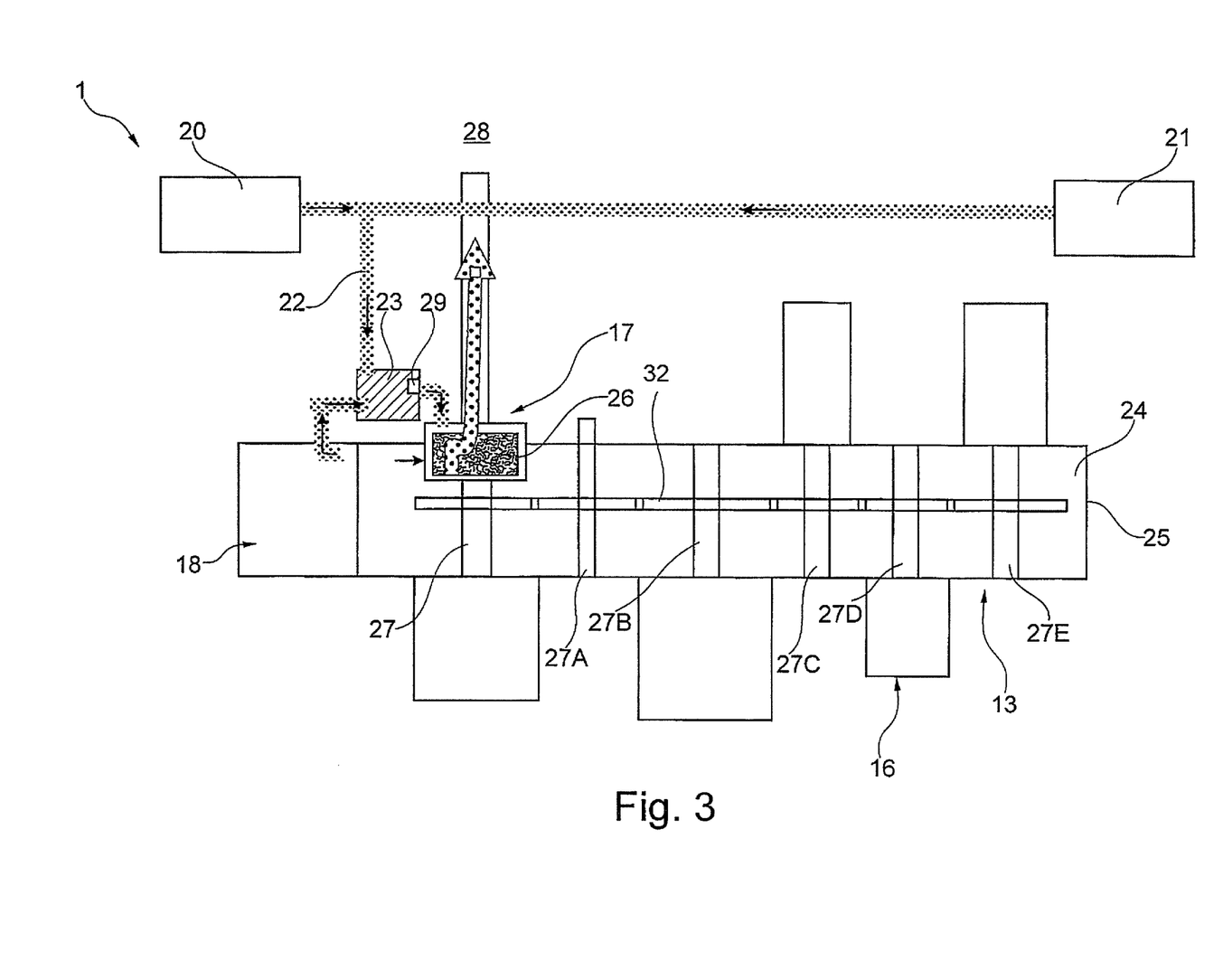
FIG. 3 shows a representation—corresponding to FIG. 2—of an embodiment—departing from FIG. 2—of the jet engine according to FIG. 1a or FIG. 1b, with a pre-chamber arranged outside a casing of the accessory gearbox.
Figure 4:
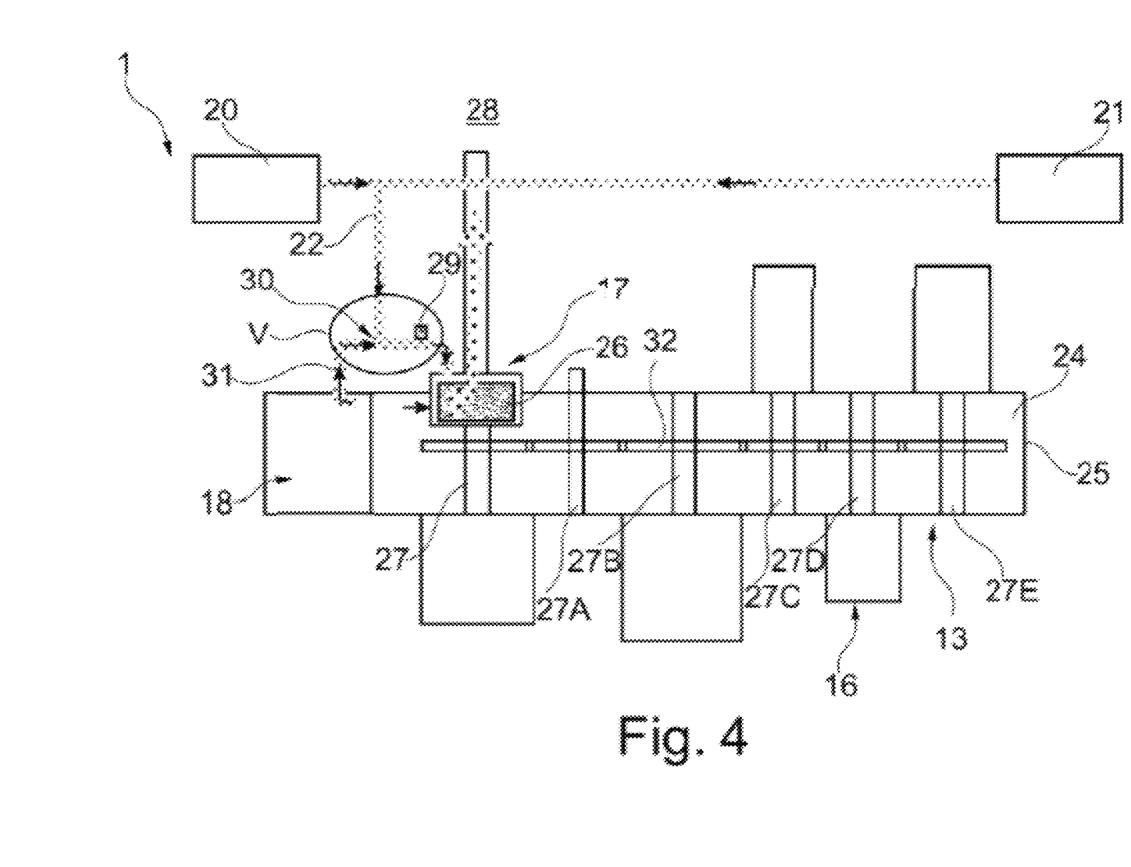
FIG. 4 shows a representation, corresponding to FIG. 2, of a further embodiment of the jet engine according to FIG. 1a or FIG. 1b, with a device for spraying oil into an air-oil volume flow arranged upstream of the oil separator.

FIG. 2 to FIG. 4 show three different embodiments of the jet engine 1 according to FIG. 1a in a highly schematized form in the area of the accessory gearbox 13, the auxiliary units 16 and the oil separator 17, the latter being in the present invention in operative connection to the oil tank 18 and two further areas 20, 21 designed here as bearing chambers of the jet engine 1 and supplied during operation of the jet engine 1 with oil from the oil tank 18 for lubrication and cooling. The area 20 here represents the bearing chamber of the front bearing and the area 21 the bearing chamber of the rear bearing of the jet engine 1. The jet engine 1 according to FIG. 1 has the aspects described in more detail with reference to FIG. 2 to FIG. 4 to a substantially identical extent.

In the embodiment of the jet engine 1 shown in FIG. 2, air-oil volume flows from the front bearing chamber 20 and from the rear bearing chamber 21 can each be guided in the direction of a line section 22, which in the present invention issues into a pre-chamber 23 upstream of the oil separator 17. Furthermore, the oil tank 18 too in the present invention is connected to the pre-chamber 23, to allow introduction of an air-oil volume flow from the oil tank 18 and of the air-oil volume flows from the bearing chambers 20 and 21 tangentially into the pre-chamber via the line section 22. Furthermore an interior 24 of a casing 25 of the accessory gearbox 13 is linked to the pre-chamber 23, where an air-oil volume flow from the casing 25 of the accessory gearbox 13 is introduced tangentially into the pre-chamber 23 when appropriate pressure is applied to the interior 24. The pre-chamber 23 is connected to the oil separator 17, in the interior of which a porous area 26 is rotatably arranged that can be passed by the air-oil volume flow flowing out of the pre-chamber 23.

The porous area 26 can in the present invention be driven by the accessory gearbox 13 via a gear 27 and acts as a centrifuge in order to reduce as far as possible the proportion of oil in the air-oil volume flow flowing through the porous area 26. The proportion of oil of the air-oil volume flow in the oil separator 17 is here reduced in the zone of the porous area 26 by separation of the oil from the air, on the one hand as during flowing through an impingement filter and on the other hand as in the area of a centrifuge, due to the rotation of the porous area 26. The oil filtered out of the air-oil volume flow in the zone of the porous area 26 is extracted in the outer area of the oil separator 17, in a manner not shown in detail, via a pump device and returned to the oil tank 18. The air flowing out of the oil separator 17 in the direction of the environment 28 has only a low oil load. The gear 27 is, in addition to further gears 27A to 27E, non-rotatably connected to a gear shaft 32 and arranged in the interior 24 of the accessory gearbox 13.

Figure 5:
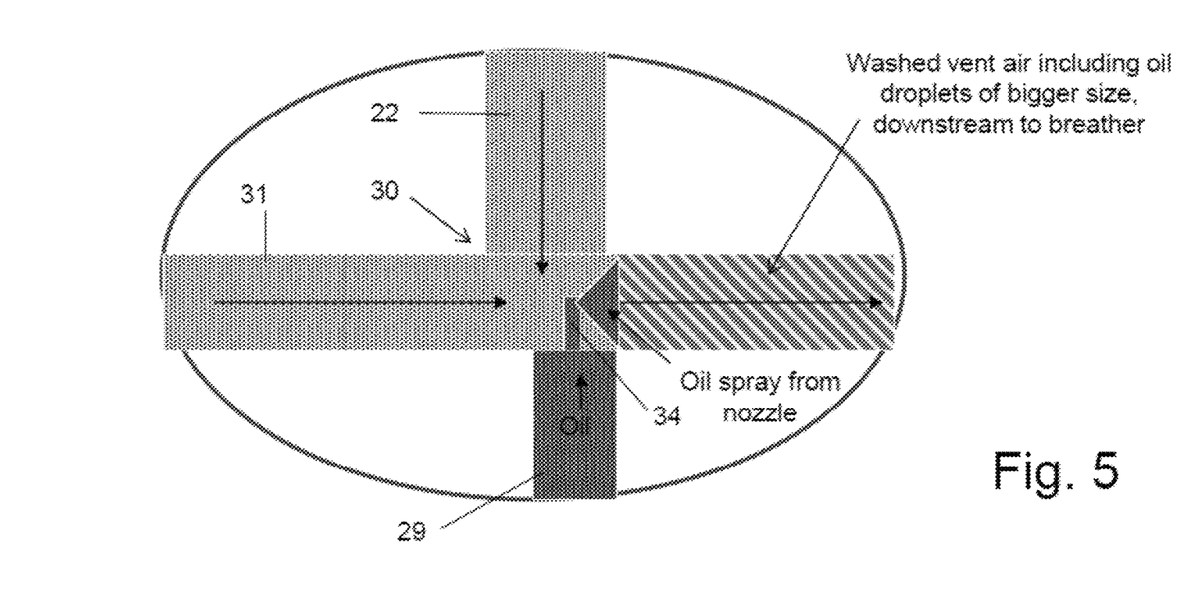
FIG. 5 shows an enlarged representation of an area V shown in more detail in FIG. 4.

To enable the oil load of the air volume flow flowing-off in the direction of the environment 28 to be set as low as possible, in the present invention a device 29 is provided in the area of the transition between the pre-chamber 23 and the oil separator 17, by means of which oil is sprayed into the air-oil volume flow flowing from the pre-chamber 23 in the direction of the oil separator 17 with a defined droplet size. To do so, the device 29 is designed with an oil nozzle 34 (FIG. 5), said oil nozzle 34 being configured such that during spraying of oil into the air-oil volume flow flowing in the direction of the oil separator 17, oil drops are generated which are mostly larger than those oil drops that cannot be filtered out in the porous area 26 due to their small size.

Also upstream of the device 29, a deflection area is provided in the area of the pre-chamber 23 for the air-oil volume flows passed out of the interior 24 and out of the oil tank 18 into the pre-chamber 23 via the line section 22, in which deflection area at least part of the oil is separated from the air-oil volume flows of the bearing chambers 20 and 21, the interior 24 and the oil tank 18 by the centrifugal force acting in the deflection area. As a result, the oil load of the air-oil volume flow is already reduced in the deflection area of the pre-chamber 23 by filtering out larger droplets, which have a greater inertia than oil particles with smaller diameters.

Subsequently, the smaller droplets present in the air-oil volume flow flowing out in the direction of the oil separator 17 from the pre-chamber 23 are enlarged by spraying in oil via the device 29, which is favoured by the forces of attraction prevailing in each case between the individual oil droplets. If the air-oil volume flow enriched with oil flows through the oil separator 17 and its porous area 26, which rotates accordingly during operation of the jet engine 1, a substantial proportion of the oil present in the air-oil volume flow is hurled outwards and then extracted from the oil separator 17 in the direction of the oil tank 18. The oil particles now enlarged by washing out the oil can be separated from the metal foam 26 in the breather 17 substantially more efficiently, by spraying in oil, so that oil losses of the jet engine 1 in the direction of the environment 28 are minimized by the reduced emissions.

Alternatively to the above description, it is also possible that the device 29 is arranged upstream of the deflection area of the pre-chamber 23, acting as a centrifuge, and that the larger drops forming in the air-oil volume flow downstream of the device 29 due to the combination of the oil droplets are separated in the deflection area of the pre-chamber 23 due to the effect of the centrifugal force. The further separation process previously described then takes place in the rotating porous area 26 of the oil separator 17, before the air flowing out of the oil separator 17 is discharged in the direction of the environment 28 with only a small load of oil.

With the design according to FIG. 2, the pre-chamber 23 is completely integrated into the casing 25 of the accessory gearbox 13, while the oil separator 17 engages at least in some areas in the interior 24 of the accessory gearbox 13.

In contrast to this, the pre-chamber 23 in the design of the jet engine 1 according to FIG. 3 is arranged completely outside the casing of the accessory gearbox 13, while the oil separator 17 is arranged, to the same extent as in the design of the jet engine 1 according to FIG. 2, inside the casing 25 in some areas. As in the design of the jet engine 1 according to FIG. 2, in the jet engine 1 according to FIG. 3 too, the air-oil volume flows out of the bearing chambers 20 and 21, the oil tank 18 and the interior 24 of the accessory gearbox 13 are initially introduced tangentially into the pre-chamber 23 and passed on via the deflection area in the direction of the device 29, in the area of which oil is again sprayed into the collected air-oil volume flow. Then the oil-enriched air-oil volume flow is introduced into the oil separator 17 and flows there through the porous area 26.

The jet engine 1 according to FIG. 4 is, in contrast to this, designed without the pre-chamber 23 and can be used for—among other things—a jet engine, the oil tank of which is not integrated into the accessory gearbox 13 and is preferably arranged inside an installation space at a distance from the accessory gearbox 13 inside the jet engine. The oil-enriched air-oil volume flows in the area of the bearing chambers 20 and 21 and in the area of the oil tank 18 are introduced—downstream of a line section node 30, into the area of which the line section 22 and a further line section 31 connected to the oil tank 18 discharge—into the deflection area, in which part of the oil from the combined air-oil volume flow is separated. Again downstream of the deflection device, oil is sprayed by the device 29 into the air-oil volume flow flowing off from the line section node 30, as shown in highly schematic form in FIG. 5. The washed air-oil volume flow flows with larger oil drops into the oil separator 17, in which the oil is separated in the zone of the rotating porous area 26 in the manner previously described. In addition, the air-oil volume flow from the interior 24 of the accessory gearbox 13 is introduced tangentially and directly into the oil separator 17, in order to clean to the required extent the consumed air loaded with oil and flowing out of the pressurized casing 25 in the area of the oil separator 17.

LIST OF REFERENCE NUMERALS

1 Jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Auxiliary units
16A Inner gearbox
17 Oil separator
18 Oil tank
19 Component
20 Area, front bearing chamber
21 Area, rear bearing chamber
22 Line section
23 Pre-chamber
24 Interior
25 Casing
26 Porous area
27 Gear
27A to 27E Gear
28 Environment
29 Device
30 Line section node
31 Further line section
32 Gear shaft

What is claimed is:

1. A jet engine including:
   an oil separator,
   at least one line section forming an internal flow path for an air-oil volume flow from an area supplied with oil to the oil separator for separating the oil,
   an oil spraying device including a nozzle for spraying a defined oil spray into the internal flow path,
   wherein the oil spraying device is positioned to spray the defined oil spray into at least one chosen from an area of each connection between the area supplied with oil and the oil separator and downstream of a combining area between at least two air-oil volume flows from at least two areas supplied with oil.

2. The jet engine in accordance with claim 1, wherein the oil separator includes a porous area that is rotatable and which is arranged in the internal flow path.

3. The jet engine in accordance with claim 2, wherein the oil spraying device is provided upstream of the porous area.

4. The jet engine in accordance with claim 3, and further comprising a deflection area upstream of the porous area of the oil separator, the deflection area being provided in the internal flow path.

5. The jet engine in accordance with claim 4, and further comprising a centrifuge upstream of the porous area of the oil separator, the centrifuge being provided in the internal flow path.

6. The jet engine in accordance with claim 5, wherein at least one chosen from the deflection area and the centrifuge is provided in an area of the oil separator.

7. The jet engine in accordance with claim 5, wherein at least one chosen from the deflection area and the centrifuge is provided in an area of a pre-chamber.

8. The jet engine in accordance with claim 7, wherein at least one chosen from the oil separator, the pre-chamber, the deflection area and the centrifuge is arranged at least partially inside a casing of an accessory gearbox.

9. The jet engine in accordance with claim 5, wherein the oil spraying device is at least one chosen from provided upstream of the deflection area, provided downstream of the deflection area, provided upstream of the centrifuge and provided downstream of the centrifuge.

10. The jet engine in accordance with claim 7, wherein at least one chosen from the oil separator, the pre-chamber, the deflection area and the centrifuge is arranged at least partially outside a casing of an accessory gearbox.

11. The jet engine in accordance with claim 1, wherein the internal flow path leads from a plurality of areas supplied with of in a direction of the oil separator and combines at least partially before entry into the oil separator.

12. The jet engine in accordance with claim 1, wherein the area supplied with oil is an accessory gearbox having an internal pressure during operation that can be raised to values above a pressure threshold.

13. The jet engine in accordance with one of the claim 1, wherein the area supplied with oil is an oil tank or a bearing chamber.

* * * * *